July 16, 1963  J. BURNHAM  3,098,182
ELECTROLYTIC CAPACITORS
Filed Oct. 21, 1958  2 Sheets-Sheet 1

INVENTOR.
JOHN BURNHAM
BY
ATTORNEY

INVENTOR.
JOHN BURNHAM
BY
ATTORNEY

United States Patent Office 3,098,182
Patented July 16, 1963

3,098,182
ELECTROLYTIC CAPACITORS
John Burnham, Los Angeles, Calif.
Filed Oct. 21, 1958, Ser. No. 768,698
6 Claims. (Cl. 317—230)

This invention pertains to new and improved electrolytic capacitors, and more especially to non-polar, self healing electrolytic capacitors.

For many applications electrostatic capacitors as manufactured at the present time are quite suitable. Such units are non-polar; that is, the electrodes used with them may be connected to either a positive or a negative terminal or wire in an electric circuit. Common electrostatic capacitors are not, however, self-healing. In other words, if the dielectric within them is perforated as by scintillation these units are permanently damaged.

Because of size and capacitance considerations electrolytic capacitors are commonly employed instead of electrostatic capacitors. Such electrolytic capacitors are used because of the comparatively high dielectric strengths of the valve metal oxide layer used in them and because of the fact the effective surface area of an electrode covered by such a layer can be increased as by etching the electrode surface prior to forming an oxide layer on it. Conventional electrolytic capacitors are, however, limited in several ways. A valve-metal oxide layer is capable of passing current in one direction, but not passing it in the other direction. If conventional electrolytic capacitors are connected in the wrong direction in an electrical circuit they are normally destroyed. Frequently they "blow up" due to gas formation in the electrolyte. Thus, a conventional electrolytic capacitor is of a definite polar nature. Electrolytic capacitors employing two anodized valve metal electrodes and a third electrode which are of a non-polar nature, are well known.

A broad object of this invention is to provide new and improved electrolytic capacitors not having inherent limitations and disadvantages of prior electrolytic capacitors as briefly indicated in the preceding discussion. An object of this invention is to provide non-polar electrolytic capacitors. Another object is to provide self-healing electrolytic capacitors, that is, capacitors which will perform satisfactorily if subjected to temporary over-voltages.

Further objectives of this invention are to provide electrolytic capacitors which can be satisfactorily used over a wide range of temperatures and which are effectively immune from difficulties arising by gas formation within the electrolytes employed with them. A still further object of this invention is to provide electrolytic capacitors which are comparatively easy and inexpensive to manufacture. An object of this invention is also to provide electrolytic capacitors which can employ a wide variety of different types of electrode structures. In effect, this invention pertains to electrolytic capacitors having advantages previously only possessed by either electrolytic or electrostatic capacitors, but not both.

These and other objects and advantages of this invention will be apparent to those skilled in the art to which this invention pertains from a consideration of the remainder of this specification, including the appended claims and the accompanying drawing in which:

Figure 1:
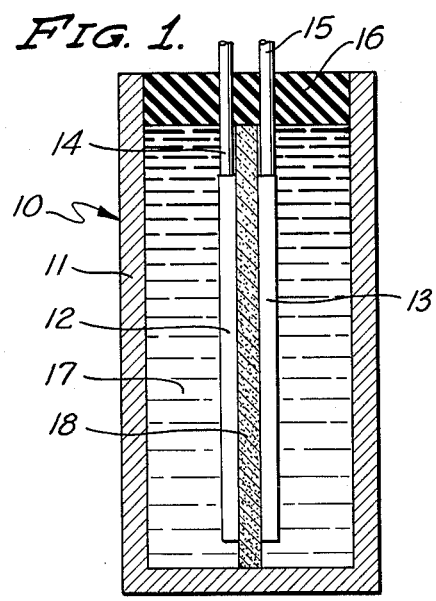
FIG. 1 is a side elevational view, partially in section, of an electrolytic capacitor of this invention.
Figure 2:
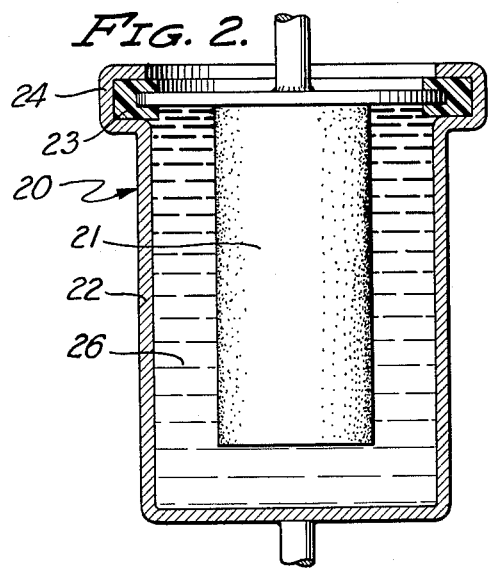
FIG. 2 is a side elevational view, partially in section, of another electrolytic capacitor of this invention.
Figure 3:
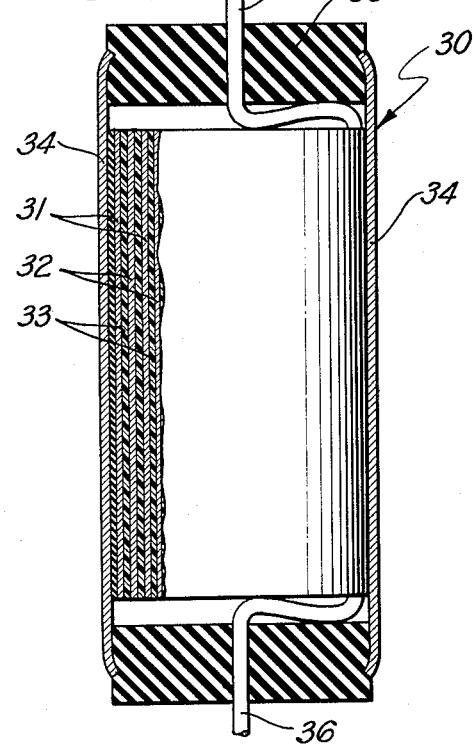
FIG. 3 is a side elevational view, partially in section, of a further electrolytic capacitor of this invention.
Figure 4:
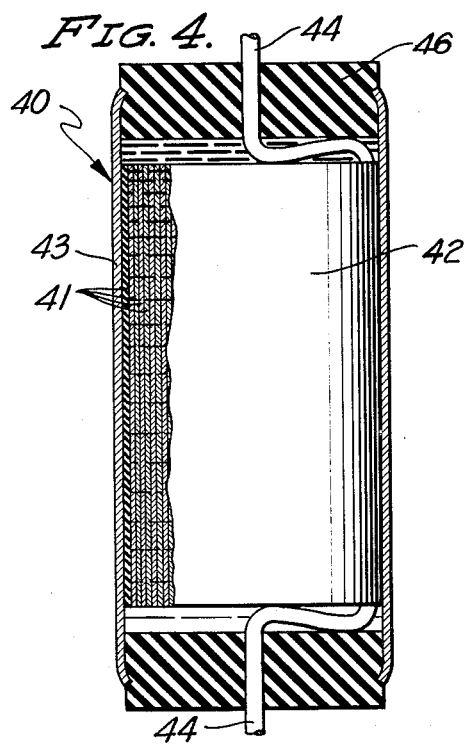
FIG. 4 is a side elevational view, partially in section, of a still further electrolytic capacitor of this invention.

As an aid to understanding this invention it can be stated in essentially summary form that it concerns electrolytic capacitors which include electrodes directly separated by a specific type of electrolyte. This electrolyte comprises an conductive mixture of at least one aliphatic acid or anhydride and at least one heterocyclic compound having a nitrogen heterocyclic atom. The fact that the electrodes used are directly separated by this electrolyte employed is important, and is a distinguishing feature of this invention.

Prior electrolytic capacitors employed at least one valve metal electrode such as aluminum or tantalum, and such an electrode was always covered with an adherent layer of an oxide of such a metal serving as a dielectric. With the present invention such an oxide layer is not required. The electrolyte employed in a unit of this invention need not be separated from the electrodes used by any separate dielectric. Thus, the capacitors of this invention are much simpler than prior units, and, in effect, leave out a separate "part" of prior electrolytic capacitors. They can be manufactured without the conventional prior anodizing step necessary to create this "part." Further, the capacities of the capacitors of this invention, and in particular those employing etched electrodes, are greater than those of comparable conventional capacitors because of the omission of the conventional valve metal oxide layer.

Because of the fact that an adherent valve metal oxide layer is not required with this invention, a large number of different metals can be used for the electrodes in capacitors of this invention. Thus, non-film forming metals such as gold, platinum, nickel, arsenic, antimony, silicon, germanium and various alloys such as known stainless steels and Monel alloys can be employed as electrodes, in addition to such metals as aluminum, tantalum, and less known film forming metals. Only metals or alloys which are inert in the electrolytes employed with the invention should be used as electrodes. The same or different metals can be employed as electrodes in a simple capacitor as herein described, and these electrodes can have the same or different shapes.

This is illustrated by the electrolytic capacitors 10, 20, 30 and 40 shown in FIGS. 1, 2, 3 and 4 of the drawing, respectively. The capacitor 10 is one of the simplest forms of an electrolytic capacitor of this invention. It employs an inert container 11, such as a common tube, within which there are suspended so as to be spaced from one another identical flat silver electrodes 12 and 13. These electrodes 12 and 13 are held by terminal wires 14 and 15 which, in turn, are supported by a rubber stopper 16; they are immersed in an electrolyte 17 of the type hereinafter described. If desired, the electrodes may be spaced from one another by an inert spacer 18, such as a perforate ceramic sheet.

The electrolytic capacitor 20 employs a porous sintered tantalum electrode 21 within a silver cup 22 serving as another electrode. The electrodes 21 and 22 are insulated from one another by a polytetrafluoroethylene washer 23 serving to hold the electrode 21 in place. The washer 23 is held by a conventional flange 24 on the cup 22. This cup 22 is filled with a liquid electrolyte 26 of the type hereinafter described which penetrates the pores of the electrode 21.

The electrolytic capacitor 30 differs from the other two capacitors 10 and 20 in several ways. It employs two opposed metal foils 31 and 32 separated by a somewhat viscous, sheet-like polymeric electrolyte 33 as hereinafter described. Preferably the electrodes 31 and 32 are, in this construction, etched so as to increase their effective, actual surface area over their apparent surface area in accordance with known techniques. The foils 31 and 32 and the electrolyte 33 in the capacitor 30 are rolled together and inserted within an inert tube 34 or housing through which there are external terminals 35 and 36 attached to the electrodes 31 and 32. The entire housing may be sealed by conventional inert end seals 38.

The electrolytic capacitor 40 employs strips of metallized papers 41 of a conventional type metallized with aluminum, nickel zinc, silver or the like rolled in a conventional manner into a capacitor unit 42. This unit is placed in an appropriate container 43 which carries terminals 44 extending from the unit 42. This entire unit 42 is impregnated with a semi-liquid electrolyte of the type herein described, and the end of the container is sealed with an inert cap 46.

The illustration of the capacitors 10, 20, 30 and 40 is not to be taken as limiting this invention in any respect. One virtue of this invention lies in the fact that electrolytic capacitors as herein described can be built in what is considered to be an infinite variety of sizes and shapes. Thus, these units can be manufactured using coil wire electrodes, etched or unetched foil or plate electrodes either stacked or rolled together, etc., and an inert, porous spacer may or may not be used between these electrodes as desired. However, in all capacitors of this invention a specific type of electrolyte is employed in contact with the electrodes used.

As briefly indicated above such an electrolyte consists of a mixture of at least one aliphatic acid or acid anhydride or aryl halide derivative and at least one heterocyclic compound in which the heterocyclic atom is nitrogen. Such electrolytes may be liquid, semi-liquid, or of a viscous-film-like character or of a polymeric, solid character depending upon their specific application, and the temperature range over which they are to be used.

These electrolytes can be formed using liquid aliphatic acids such as formic, acetic, propionic, butyric, valeric and heptoic or corresponding saturated acids having up to the same number of carbon atoms in branched chains. Corresponding unsaturated or vinyl acids such as acrylic acid having the same number of carbon atoms may also be employed. Also, the alpha substituted halide derivatives of these acids, such as alphachloroacetic acid, or the anhydrides of any of these acids, such as acetic anhydride, can be employed. At least one of such acids or anhydrides must be employed with the invention; if desired, a mixture of them can be utilized.

A large number of different heterocyclic compounds can be employed in the electrolytes of this invention. At least one of such compounds must be employed; if desired, a mixture of them can be utilized. Suitable heterocyclic compounds having one or more six membered rings are pyridine, alpha-, beta-, or gamma-picoline, quinoline, isoquinoline, known lutidines such as 2-6 lutidine, morpholine, etc.; some of these compounds are bicyclic, and, hence, include at least one six membered heterocyclic ring. Suitable compounds having five membered rings are pyrrole, indole, etc. Compounds such as thiazole containing other elements besides nitrogen and carbon in the ring structure are suitable for use within the invention. Compounds such as imidazole which contain several nitrogen atoms in the ring structure are also suitable provided these nitrogen atoms are not positioned immediately adjacent to one another within the ring structure.

It may be stated that all of these heterocyclic compounds contain either a five- or six-membered ring in which nitrogen is a heterocyclic nitrogen atom located between two carbon atoms. Obviously the above listing of heterocyclic compounds is not to be taken as being complete. An extremely large number of equivalent compounds may be employed in which inert groups such as methyl, ethyl, propyl, or isopropyl groups or corresponding unsaturated groups containing, for example, a vinyl double bond are attached to the carbon atoms within the ring structure groups.

Saturated compounds such as are indicated in the preceding are primarily useful where it is desired to obtain an electrolyte of a liquid character. An important feature of the present invention lies in the discovery that various vinyl derivatives of such compounds, such as various vinyl pyridines, vinyl picolines, vinyl quinolines, pyrroles, indoles, etc., can be utilized to form satisfactory electrolyes of either a viscous, semi-solid character or of a solid polymeric type. Either the saturated or unsaturated acids or derivatives as indicated above can be employed in forming such electrolytes.

In forming electrolytes having these physical characteristics, the acidic ingredient or ingredients employed are mixed with a vinyl compound or a mixture of vinyl compounds and the mixture is polymerized so as to produce the final electrolyte desired. Such polymerization can be conveniently carried out using conventional vinyl polymerization catalysts such as hydrogen peroxide. Thus a solid electrolyte of this invention has been formed from 70 parts by weight vinyl pyridine and 30 parts by weight acrylic acid using a small quantity of hydrogen peroxide as a catalyst. Thermosetting polymeric electrolytes of the invention can be formed as well as various thermoplastic electrolytes. In such cases appropriate functional groups are, of course, used on one or more ingredients of the electrolyte itself.

Mixtures of both saturated and unsaturated compounds as indicated can, of course, be present during polymerization. Such polymer mixtures are primarily desired when electrolytes of a viscous, semi-solid character are desired. With polymers such as are created by this procedure, the saturated ingredient or ingredients employed apparently exert a plasticizing influence on the complete polymer created.

Figure 5:
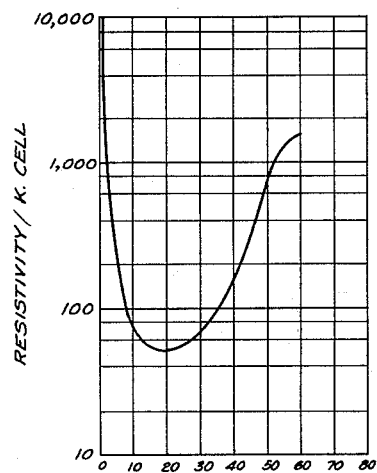
FIGS. 5 to 9 are curves showing the resistivities of electrolytes employed with electrolytic capacitors of this invention.
Figure 6:
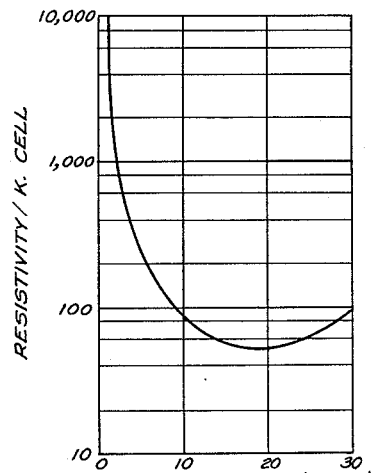
Figure 7:
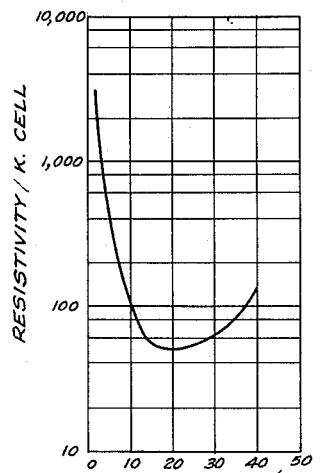
Figure 8:
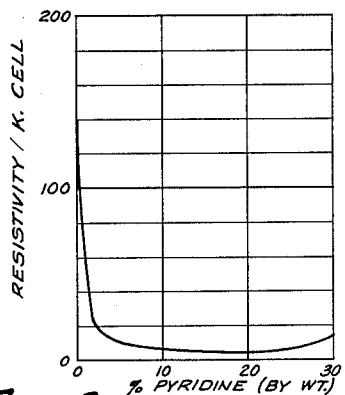
Figure 9:
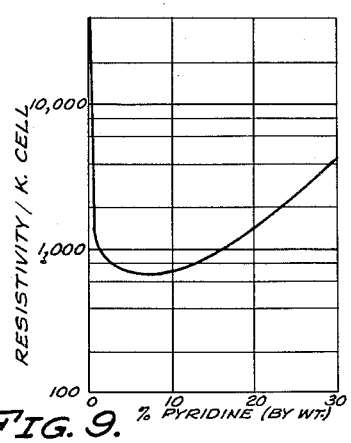

In order to aid in understanding these electrolytes FIGS. 5-9 are enclosed herewith showing the manner in which the resistivities of various electrolytes of this invention vary depending upon their composition at room temperature. The curves shown in these figures indicate the so-called "bridge resistance" in ohms obtained in measuring the resistance between electrodes in a cell. FIG. 5 pertain to glacial acetic acid-pyridine electrolytes; FIG. 6 pertains to glacial acetic acid-2-6 lutidine electrolytes; FIG. 7 pertains to glacial acetic acid-2 picoline electrolytes; FIG. 8 pertains to formic acid-pyridine electrolytes; and FIG. 9 pertains to acetic anhydride-pyridine electrolytes.

In general it can be stated that it is preferred to use with this invention electrolytes having resistivities of anywhere from 25 to 5,000 ohm-cm. at room temperature depending upon the specific use intended. The compositions of other electrolytes of this invention having a desired conductivity can easily be determined by routine experimentation. In general these electrolytes can be used at voltages up to about 50 volts; their conductivties change somewhat at various temperatures.

An important feature of this invention lies in the fact that the electrolytic capacitors herein described can be used and operated at elevated temperatures without gas formation in the electrolyte. For many applications this is exceedingly important. The capacitors herein described may be hermetically sealed without danger of these units breaking open due to gas formation, except, in a few limited, normally undesired cases when minor amounts of volatile impurities, such as water are present in these electrolytes.

Figure 10:
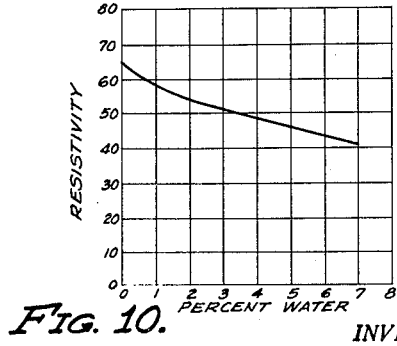
FIG. 10 is a curve showing the effect of small amounts of water upon an electrolyte employed in an electrolytic capacitor of this invention.

Minor amounts of certain impurities can be present in these electrolytes without affecting their ability to serve the purpose intended although this is not normally preferred. This is shown in FIG. 10 where there is shown the effect of the presence of a small percentage of water upon the resisitivity of an electrolyte containing 1 part pyridine to 3.3 parts glacial acetic acid (parts by weight) at 16° C.

The unique character of the various electrolytic capacitors of this invention can be demonstrated in a number of different ways. With units of this invention it has been discovered that with polarizing voltages of from about 2 to about 4 volts that the capacities of these units are the same or nearly the same a short time after the polarities of the two electrodes in these units have been reversed. This is considered extremely significant. Also the leakage current across these electrodes stabilizes to a nominal value after polarization for a comparatively short period at a low D.C. voltage as indicated.

The mechanism by which an electrolyte as herein described "works" in an electrolytic capacitor is understood at the present time. It is believed that the two types of ingredients of this electrolyte probably form a complex which is polarized at an uncoated electrode surface so as to form a thin film or layer at such a surface exhibiting charcteristics which at least suggest the character of a p-n semiconductor junction. This belief is supported by the fact that the spacing of the electrodes with respect to one another is not as important with electrolytic capacitors as herein defined as with conventional electrolytic capacitors. Such a thin film can apparently be formed in a solid polymeric electrolyte as described because of the ability of the molecular chains in such a solid to move slightly at normal temperatures. If desired metallic electrodes can be deposited as by vacuum metallizing or other techniques directly upon such a solid electrolyte.

Those skilled in the art to which this invention pertains will realize that it is of such a character as to be capable of being used in a variety of different ways. For this reason this invention is to be considered as being limited only by the appended claims. This application is a continuation-in-part of the copending application Ser. No. 697,159 filed Nov. 18, 1957, the disclosure of which is incorporated herein by reference. The electrolytes disclosed in this copending application can be employed with electrolytic capacitors as defined in this specification.

I claim:
1. An electrolytic capacitor consisting essentially of two metal electrodes, the surfaces of each of said electrodes containing no oxide dielectric; being in direct contact with, and separated by an electrolyte comprising a liquid mixture of at least one heterocyclic amine containing a nitrogen heterocyclic atom located between two carbon atoms, and a compound selected from the group consisting of aliphatic acids containing from 1 to 6 carbon atoms, alpha-halogen substituted aliphatic acids containing from 1 to 6 carbon atoms and anhydrides thereof said electrolyte having a resistivity of from 25 to 5,000 ohm-cm. at room temperature.

2. An electrolytic capacitor consisting essentially of two metal electrodes, the surfaces of each of said electrodes containing no oxide dielectric being in direct contact with, and separated by an electrolyte comprising a mixture of a compound selected from the group consisting of aliphatic acids containing from 1 to 6 carbon atoms, alpha-halogen substituted aliphatic acids containing from 1 to 6 carbon atoms and anyhdrides thereof and a polymer of a vinyl derivative of at least one heterocyclic amine containing a nitrogen heterocyclic atom located between two carbon atoms said electrolyte having a resistivity of from 25 to 5,000 ohm-cm. at room temperature.

3. An electrolytic capacitor consisting essentially of two metal electrodes, the surfaces of said electrodes containing no oxide dielectric being in direct contact with and being separated by an electrolyte comprising a polymerized mixture of at least one vinyl derivative of at least one heterocyclic amine containing a nitrogen heterocyclic atom located between two carbon atoms, and a compound selected from the group consisting of unsaturated aliphatic acids containing from 1 to 6 carbon atoms, alpha-halogen substituted unsaturated aliphatic acids containing from 1 to 6 carbon atoms, and anhydrides thereof said electrolyte having a resistivity of from 25 to 5,000 ohm-cm. at room temperature.

4. An electrolytic capacitor consisting essentially of a cup-like electrode and a porous, sintered electrode located within said first electrodes, the surfaces of said electrodes containing no oxide dielectric said electrodes being separated from one another, and being in direct contact with an electrolyte comprising a mixture of at least one heterocyclic amine containing a nitrogen heterocyclic atom located between two carbon atoms, and a compound selected from the group consisting of aliphatic acids containing from 1 to 6 carbon atoms, alpha-halogen substituted aliphatic acids containing from 1 to 6 carbon atoms and anhydrides thereof said electrolyte having a resistivity of from 25 to 5,000 ohm-cm. at room temperature.

5. An electrolytic capacitor consisting essentially of two etched foil electrodes, the surfaces of said electrodes containing no oxide dielectric said electrodes being separated by and being in direct contact with an electrolyte comprising a mixture of at least one heterocyclic amine containing a nitrogen heterocyclic atom located between two carbon atoms, and a compound selected from the group consisting of aliphatic acids containing from 1 to 6 carbon atoms, alpha-halogen substituted aliphatic acids containing from 1 to 6 carbon atoms and anhydrides thereof said electrolyte having a resistivity of from 25 to 5,000 ohm-cm. at room temperature.

6. An electrolytic capacitor consisting essentially of strips of metalized paper, said strips being rolled with respect to one another so that the metal deposits on said strips serve as electrodes and so that said electrodes are separated from one another, the surfaces of said electrodes containing no oxide dielectric said paper strips being impregnated with a liquid electrolyte in direct contact with said metal deposits, said electrolyte comprising a mixture of at least one heterocyclic amine containing a nitrogen heterocyclic atom located between two carbon atoms, and a compound selected from the group consisting of aliphatic acids containing from 1 to 6 carbon atoms, alpha-halogen substituted aliphatic acids containing from 1 to 6 carbon atoms and anhydrides thereof said electrolyte having a resistivity of from 25 to 5,000 ohm-cm. at room temperature.

References Cited in the file of this patent

UNITED STATES PATENTS

| | | |
|---|---|---|
| 1,673,434 | Andrews | Nov. 7, 1927 |
| 2,104,733 | Brennan | Jan. 11, 1938 |
| 2,155,086 | Georgiev | Apr. 18, 1939 |
| 2,310,932 | Brennan | Feb. 16, 1943 |
| 2,736,846 | Gables | Feb. 28, 1956 |
| 2,800,616 | Becker | July 23, 1957 |

FOREIGN PATENTS

| | | |
|---|---|---|
| 269,378 | Great Britain | Apr. 21, 1927 |
| 277,152 | Great Britain | Sept. 15, 1927 |